United States Patent
Xu et al.

(10) Patent No.: US 12,279,616 B2
(45) Date of Patent: Apr. 22, 2025

(54) STABILIZATION OF DIMPROPYRIDAZ SUSPENSIONS BY TRIETHYLAMMONIUM CHLORIDE

(71) Applicant: BASF SE, Ludwigshafen (DE)

(72) Inventors: Wen Xu, Research Triangle Park, NC (US); Karen Walden Benton, Research Triangle Park, NC (US); Holden Cole Harrington, Pittsboro, NC (US); Joachim Gebhardt, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 538 days.

(21) Appl. No.: 17/773,087

(22) PCT Filed: Nov. 16, 2020

(86) PCT No.: PCT/EP2020/082190
§ 371 (c)(1),
(2) Date: Apr. 29, 2022

(87) PCT Pub. No.: WO2021/104907
PCT Pub. Date: Jun. 3, 2021

(65) Prior Publication Data
US 2023/0141813 A1    May 11, 2023

(30) Foreign Application Priority Data

Nov. 26, 2019 (EP) .................................... 19211618

(51) Int. Cl.
| | | |
|---|---|---|
| A01N 43/58 | (2006.01) | |
| A01N 25/04 | (2006.01) | |
| A01N 25/22 | (2006.01) | |
| A01P 7/04 | (2006.01) | |

(52) U.S. Cl.
CPC ............. A01N 43/58 (2013.01); A01N 25/04 (2013.01); A01N 25/22 (2013.01); A01P 7/04 (2021.08)

(58) Field of Classification Search
CPC ........ A01N 37/46; A01N 25/22; A01N 25/04; A01N 25/26; A01N 43/58; A01P 7/04
See application file for complete search history.

(56) References Cited

FOREIGN PATENT DOCUMENTS

| CN | 106614698 A | 5/2017 |
|---|---|---|
| WO | WO-2012/143317 A1 | 10/2012 |
| WO | WO-2017/025581 A1 | 2/2017 |
| WO | WO-2018/149674 A1 | 8/2018 |
| WO | WO-2020/144308 A1 | 7/2020 |

OTHER PUBLICATIONS

International Application No. PCT/EP2020/082190, International Search Report and Written Opinion, mailed Feb. 9, 2021.
European Search Report for EP Patent Application No. 19211618.4, Issued on Jan. 23, 2020, 3 pages.

*Primary Examiner* — Hong Yu
(74) *Attorney, Agent, or Firm* — MARSHALL, GERSTEIN & BORUN LLP

(57) ABSTRACT

The invention relates to an aqueous pesticidal composition comprising a) suspended particles comprising dimpropyridaz, and b) triethylammonium chloride. It also relates to a method for producing the pesticidal composition; to a method for treating plant propagation material; to the use of triethylammonium chloride for inhibiting the crystal growth of particles of dimpropyridaz that are suspended in an pesticidal composition; a method for treating or protecting an animal from infestation or infection by invertebrate pests which comprises bringing the animal in contact with a pesticidally effective amount of the pesticidal composition; to a method for combating or controlling invertebrate pests, which method comprises contacting said pest or its food supply, habitat or breeding grounds with a pesticidally effective amount of the pesticidal composition; and to a method for protecting growing plants from attack or infestation by invertebrate pests, which method comprises contacting a plant, or soil or water in which the plant is growing, with a pesticidally effective amount of the pesticidal composition.

14 Claims, No Drawings

STABILIZATION OF DIMPROPYRIDAZ SUSPENSIONS BY TRIETHYLAMMONIUM CHLORIDE

CROSS-REFERENCE TO RELATED APPLICATIONS

This is the U.S. national phase of International Application No. PCT/EP2020/082190, filed Nov. 16, 2020, which claims the benefit of European Patent Application No. 19211618.4, filed on Nov. 26, 2019.

The invention relates to an aqueous pesticidal composition; to a process for producing the pesticidal composition; to the use of triethylammonium chloride for inhibiting the crystal growth of particles of dimpropyridaz that are suspended in an aqueous pesticidal composition; to a method of treating plant propagation material; to a method for treating or protecting an animal from infestation or infection by invertebrate pests; to a method for combating or controlling invertebrate pests; and to a method for protecting growing plants from attack or infestation by invertebrate pests.

Suspension concentrates are a common formulation type for pesticidal compounds. Pesticidal suspension concentrates have an aqueous continuous phase in which particles of at least one pesticide are homogenously dispersed. Suspension concentrates are desirable formulations since they do not contain high concentrations of organic solvents. Suspension concentrates are thus considered ecologically friendly as compared to other formulation types such as emulsion concentrates or oil dispersions.

A serious drawback of suspension concentrates is, however, the tendency of particle growth upon storage. Particle growth of aqueous suspensions is caused by a process called Ostwald-ripening. Ostwald-ripening describes a process in which small particles dissolve, while larger particles gain size and weight. The driving force behind Ostwald-ripening is a difference in solubility between small and large particles. Ostwald-ripening is particularly pronounced for particles of compounds that have a moderate water-solubility.

Dimpropyridaz is a pesticide that has a water-solubility at 20° C. of approximately 4-5 wt % at 25° C. The water-solubility of dimpropyridaz is comparably high and so Ostwald-ripening represents a crucial issue for Dimpropyridaz suspension concentrates.

It was surprisingly discovered that the addition of at least 0.3 wt % of triethylammonium chloride to an aqueous suspension of dimpropyridaz is capable of stabilizing the suspended dimpropyridaz particles. The crystal growth is significantly reduced by the addition of triethylammonium chloride. In turn, no sedimentation or caking of the pesticide is observed. The stabilizing effect can be observed at a concentration of the triethylammonium chloride of at least 0.3 wt % based on the total weight of the pesticidal composition.

The invention thus relates to an aqueous pesticidal composition comprising
 a) suspended particles comprising dimpropyridaz;
 b) triethylammonium chloride;
wherein the concentration of the triethylammonium chloride is at least 0.3 wt % based on the total weight of the pesticidal composition.

Dimpropyridaz is the common name of compound 1-[1,2-dimethylpropyl]-N-ethyl-5-methyl-N-pyridazin-4-yl-1H-pyrazole-4-carboxamide. Dimpropyridaz has a center of chirality, and in turn two enantiomers have been described (see ip.com IPCOM000256756D), 1-[(1R)-1,2-dimethylpropyl]-N-ethyl-5-methyl-N-pyridazin-4-yl-1H-pyrazole-4-carboxamide (hereinafter referred to as "R-enantiomer"), and 1-[(1S)-1,2-dimethylpropyl]-N-ethyl-5-methyl-N-pyridazin-4-yl-1H-pyrazole-4-carboxamide (hereinafter referred to as "S-enantiomer"). The S-enantiomer and the R-enantiomer are depicted by formulae I-A and I-B, respectively:

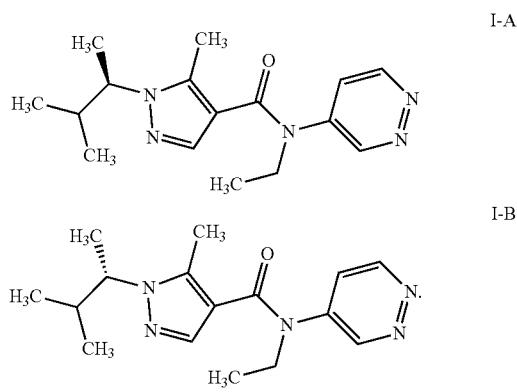

Accordingly, the term "dimpropyridaz" as used herein refers to the S-enantiomer, the R-enantiomer, and racemic mixtures thereof. Preferably, the term dimpropyridaz refers to racemic mixtures of the S-enantiomer and the R-enantiomer.

The aqueous pesticidal composition contains suspended particles comprising dimpropyridaz. Preferably, the suspended particles consist of dimpropyridaz. The suspended particles are typically suspended crystalline particles of dimpropyridaz.

Dimpropyridaz occurs in at least two crystal forms, which are hereinafter referred to as "polymorph A" and "polymorph B". Dimpropyridaz, its activity against arthropod pests and general procedures for its production are known from WO2012/143317. Applying these general procedures to the production of dimpropyridaz yield this compound as a glassy melt, which contains the polymorph A. The suspended particles comprising dimpropyridaz typically relate to suspended crystalline particles of dimpropyridaz that are of polymorph A, polymorph B, or a mixture thereof. In one embodiment, the suspended particles comprising dimpropyridaz relates to suspended crystalline particles of dimpropyridaz in the polymorph A form. In another embodiment, the suspended particles comprising dimpropyridaz relates to suspended crystalline particles of dimpropyridaz in the polymorph B form.

The polymorph A can be identified and distinguished from form B by powder X-ray diffractome-try. The PXRD pattern of the polymorph form A recorded using Cu-Kα radiation (1.54178 Å) at 25° C. displays at least 3 of the following reflections, quoted as 2θ values: 16.16±0.10°, 20.36±0.10°, 23.92±0.10°, 24.29±0.10° and 27.43±0.10°. These reflections are not present in the form B. In addition to these 5 reflections, the polymorph A may display in such a diagram one or more, in particular at least 2, often at least 4, in particular at least 6 or at least 8 reflections and especially all of the reflections quoted hereinafter as 2θ values: 7.95±0.10°, 10.16±0.10°, 12.40±0.10°, 15.31±0.10°, 15.89±0.10°, 16.53±0.10°, 18.02±0.10°, 19.25±0.10°, 20.93±0.10°, 23.44±0.10°, 23.70±0.10°, 26.16±0.10°, 30.71±0.10° and 32.92±0.10°. From amongst the peaks of PXRD pattern of the polymorph A, those at the following 2θ values are the most prominent ones: 10.16±0.10°, 15.31±0.10°, 15.89±0.10°, 16.16±0.10°, 16.53±0.10°, 19.25±0.10°, 20.36±0.10°, 20.93±0.10°, 23.44±0.10°, 23.70±0.10°, 23.92±0.10°, 224. 29±0.10°, 26.16±0.10°, 30.71±0.10° and 32.92±0.10°.

When analyzed by differential scanning calorimetry (DSC) polymorph A displays a thermo-gram with a characteristic endothermic peak, also referred to as melting peak. The melting point, determined as the onset of the melting peak, typically lies in the range from about 82° C. to 87° C. The values quoted here relate to values determined by DSC using an aluminum closed cup with a sample size of 1 to 10 mg and applying a heating rate of 10 K/min. Thermogravimetric analysis, hereinafter also referred to as TGA, revealed that no weight loss occurs on heating, which indicates that form A does not contain solvent.

The polymorph B is obtainable as described in EP Application number 19151447.0. Polymorph B can be identified by powder X-ray diffractometry on the basis of its powder X-ray diffraction diagram, hereinafter also termed powder X-ray diffraction pattern or PXRD pattern, of the polymorph B recorded using Cu-Kα radiation (1.54178 Å) at 25° C. displays the 3 following reflections, quoted as 2θ values: 20.69±0.10°, 24.15±0.10° and 30.52±0.10°. In addition to these 3 reflections, the polymorph B may display in such a PXRD pattern one or more, in particular at least 2, often at least 4, in particular at least 6 or at least 8 reflections and especially all of the reflections quoted hereinafter as 2θ values: 7.99±0.10°, 10.07±0.10°, 12.38±0.10°, 15.31±0.10°, 15.97±0.10°, 16.50±0.10°, 18.03±0.10°, 19.29±0.10°, 20.22±0.10°, 20.96±0.10°, 23.40±0.10°, 23.70±0.10°, 26.09±0.10°, 27.26±0.10° and 32.91±0.10°.

From amongst these reflections, preferably at least 1, in particular at least 2, more particularly at least 4, especially at least 6 or all of the following reflections, quoted as 2θ values, can be observed in such a PXRD pattern: 10.07±0.10°, 15.31±0.10°, 15.97±0.10°, 16.50±0.10°, 19.29±0.10°, 20.22±0.10°, 20.96±0.10° and 26.09±0.10°. In addition to these reflections preferably least 1, in particular at least 2, more particularly at least 4, especially at least 6 or all of the following reflections, quoted as 2θ values, can be observed in such a PXRD pattern: 7.99±0.10°, 12.38±0.10°, 18.03±0.10°, 23.40±0.10°, 23.70±0.10°, 27.26±0.10° and 32.91±0.10°.

Frequently, a PXRD pattern of the polymorph form B recorded using Cu-Kα radiation (1.54178 Å) at 25° C. displays the 3 following reflections, quoted as 2θ values: 20.69±0.10°, 24.15±0.10° and 30.52±0.10° and additionally the following reflections, quoted as 2θ values: 15.31 ±0.10°, 15.97±0.10° and 16.50±0.10°.

Alternatively, a PXRD pattern of the polymorph form B recorded using Cu-Kα radiation (1.54178 Å) at 25° C. displays the 3 following reflections, quoted as 2θ values: 20.69±0.10°, 24.15±0.10° and 30.52±0.10° and additionally the following reflections, quoted as 2θ values: 23.40±0.10° and 23.70±0.10°.

In particular, a PXRD pattern of the polymorph form B recorded using Cu-Kα radiation (1.54178 Å) at 25° C. displays the 3 following reflections, quoted as 2θ values: 20.69±0.10°, 24.15±0.10° and 30.52±0.10° and additionally the following reflections, quoted as 2θ values: 15.31±0.10°, 15.97±0.10°, 16.50±0.10°, 23.40±0.10° and 23.70±0.10°.

When analyzed by differential scanning calorimetry (DSC) polymorph B of the present invention displays a thermogram with a characteristic endothermic peak, also referred to as melting peak. The melting point, determined as the onset of the melting peak, typically lies in the range from about 80° C. to 90° C., in particular in the range from 82° C. to 89° C. The values quoted here relate to values determined by DSC using an aluminum closed cup with a sample size of 1-10 mg and applying a heating rate of 10 K/min. Thermogravimetric analysis, hereinafter also referred to as TGA, revealed that no weight loss occurs on heating, which confirmed the findings of the single crystal X-ray studies that polymorph B does not contain solvent.

The suspended particles comprising dimpropyridaz can be characterized by their size distributions, which can be determined by dynamic light scattering methods. The D50-value is a statistical figure that indicates a maximum particle diameter that characterizes 50% by volume of all particles. In other words, 50% (v/v) of all particles have a diameter that is equal or smaller than the D50 value. The D50 value for the particles in the instant case is typically up to 30 µm, preferably up to 25 µm, more preferably up to 20 µm, most preferably up to 10 µm, and especially preferably up to 7 µm. The D50 value for the particles is typically at least 0.1 µm, preferably at least 0.8 µm, more preferably at least 1 µm. The D50 value for the particles is typically from 0.5 to 10 µm, preferably from 1 to 8 µm, more preferably from 1 to 5 µm.

The pesticidal composition usually contains the suspended particles a) in a concentration of from 5 to 60 wt %, preferably 10 to 50 wt %, more preferably 10 to 40 wt % based on the total weight of the pesticidal composition. The pesticidal composition may contain the suspended particles a) in a concentration of at least 1 wt %, preferably at least 15 wt % based on the total weight of the pesticidal composition. The pesticidal composition may contain the suspended particles a) in a concentration of up to 45 wt %, preferably up to 35 wt %, more preferably up to 25 wt % based on the total weight of the pesticidal composition.

The pesticidal composition is an aqueous pesticidal composition, i.e. the continuous liquid phase is an aqueous liquid. The pesticidal composition may contain at least 5 wt % of water, preferably at least 10 wt %, more preferably at least 15 wt %, most preferably at least 30 wt %, especially preferably at least 50 wt % of water based on the total weight of the pesticidal composition. The pesticidal composition may contain up to 99 wt % of water, preferably up to 95 wt %, more preferably up to 90 wt %, and in particular up to 80 wt % of water based on the total weight of the pesticidal composition. The pesticidal composition usually contains 30 to 90 wt % of water, preferably 50 to 80 wt % of water based on the total weight of the pesticidal composition.

The pesticidal composition also contains triethylammonium chloride, which may be identified by CAS number 554-68-7. Triethylammoniuchloride is the adduct of triethylamine and hydrochloric acid (HCl). Accordingly, it may also be referred to as $(CH_3CH_2)_3N\text{-}HCl$. The pesticidal composition contains the triethylammonium chloride in a concentration of at least 0.3 wt %, preferably at least 0.4 wt % based on the total weight of the pesticidal composition. The pesticidal composition may contain the triethylammonium chloride in a concentration of up to 10 wt %, preferably up to 5 wt %, more preferably up to 2 wt %, especially preferably up to 1.5 wt %, e.g. up to 1 wt %. The pesticidal composition typically contains the triethylammonium chloride in a concentration of from 0.3 to 3 wt %, preferably from 0.35 to 2 wt %, more preferably from 0.4 to 1 wt %. The triethylammonium chloride is typically present in dissolved form at 20° C. in the pesticidal composition.

The weight ratio of the suspended particles a) to the triethylammonium chloride b) in the pesticidal composition is typically from 5:1 to 200:1, preferably from 10:1 to 100:1, and in particular from 15:1 to 50:1. The weight ratio of the suspended particles a) to the triethylammonium chloride b)

may be at least 2:1, preferably at least 3:1, more preferably at least 10:1. The weight ratio of the suspended particles a) to the triethylammonium chloride b) is typically up to 80:1, preferably up to 70:1.

In one embodiment, the pesticidal composition contains
a) 10 to 99 wt % of water
b) 1 to 60 wt % of the suspended particles; and
c) 0.3 to 10 wt % of triethylammonium chloride;
each time based on the total weight of the pesticidal composition.

In another embodiment, the pesticidal composition contains
a) 10 to 95 wt % of water
b) 5 to 40 wt % of the suspended particles; and
c) 0.3 to 2 wt % of triethylammonium chloride;
each time based on the total weight of the pesticidal composition.

In another embodiment, the pesticidal composition contains
a) 40 to 80 wt % of water
b) 15 to 30 wt % of the suspended particles; and
c) 0.4 to 1 wt % of triethylammonium chloride;
each time based on the total weight of the pesticidal composition.

The pesticidal composition may contain a further pesticidally active ingredient. The active ingredient may be selected from the group of fungicides, insecticides, nematicides, herbicides, safeners, micronutrients, biopesticides, nitrification inhibitors, urease inhibitors, and/or growth regulators. In one embodiment, the pesticide is an insecticide. In another embodiment, the pesticide is a fungicide. In yet another embodiment the pesticide is a herbicide. The skilled worker is familiar with such pesticides, which can be found, for example, in the Pesticide Manual, 16th Ed. (2013), The British Crop Protection Council, London. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorofenapyr, DNOC, buprofezine, cyromazine, amitraz, hydramethylnon, acequinocyl, fluacrypyrim, rotenone, or their derivatives. Suitable fungicides are fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N-phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles. Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas.

Suitable plant growth regulators are antiauxins, auxins, cytokinins, defoliants, ethylene modulators, ethylene releasers, gibberellins, growth inhibitors, morphactins, growth retardants, growth stimulators, and further unclassified plant growth regulators.

Suitable micronutrients are compounds comprising boron, zinc, iron, copper, manganese, chlorine, and molybdenum.

The concentration of the further pesticidally active ingredient in the pesticidal composition is typically at least 5 wt %, more preferably at least 10 wt %, most preferably at least 15 wt %, especially preferably at least 20 wt %, utmost preferably at least 25 wt %, and in particular at least 30 wt % based on the total weight of the pesticidal composition. The concentration of the further pesticidally active ingredient in the pesticidal composition is typically up to 95 wt %, preferably up to 85 wt %, more preferably up to 75 wt %, especially preferably up to 75 wt %, and in particular up to 65 wt % based on the total weight of the pesticidal composition. The pesticidal composition typically contains the further pesticidally active ingredient in a concentration of from 10 to 90 wt %, preferably of from 15 to 60 wt %, more preferably of from 20 to 50 wt % based on the total weight of the pesticidal composition.

The pesticidal composition is typically prepared by contacting the triethylammoniumchloride, particles comprising dimpropyridaz, and water. The triethylammonium chloride, the particles, and the water, may be contacted in any order, e.g. in a first step the particles may be contacted with water, and in turn the triethylammonium chloride may be added.

The pesticidal composition may be prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol.1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-subsituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-subsititued fatty acid amides are fatty acid glucamides or fatty acid alkanolamides. Examples of esters are fatty acid esters, glycerol esters or monoglycerides. Examples of sugarbased surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compound I on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin. Suitable anti-foaming agents are silicones, long chain alcohols, and salts of fatty acids.

Suitable colorants (e.g. in red, blue, or green) are pigments of low water solubility and watersoluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Solutions for seed treamtent (LS), Suspoemulsions (SE), flowable concentrates (FS), are usually employed for the purposes of treatment of plant propagation materials, particularly seeds. The compositions in question give, after two-to-tenfold dilution, active substance concentrations of from 0.01 to 60% by weight, preferably from 0.1 to 40% by weight, in the ready-to-use preparations. Application can be carried out before or during sowing. Methods for applying the pesticidal composition on to plant propagation material, especially seeds include dressing, coating, pelleting, dusting, soaking and in-furrow application methods of the propagation material. Preferably, the pesticidal composition are applied on to the plant propagation material by a method such that germination is not induced, e. g. by seed dressing, pelleting, coating and dusting.

When employed in plant protection, the amounts of active ingredient applied are, depending on the kind of effect desired, from 0.001 to 2 kg per ha, preferably from 0.005 to 2 kg per ha, more preferably from 0.05 to 0.9 kg per ha, and in particular from 0.1 to 0.75 kg per ha.

In treatment of plant propagation materials such as seeds, e. g. by dusting, coating or drenching seed, amounts of active ingredient of from 0.1 to 1000 g, preferably from 1 to 1000 g, more preferably from 1 to 100 g and most preferably from 5 to 100 g, per 100 kilogram of plant propagation material (preferably seeds) are generally required.

When used in the protection of materials or stored products, the amount of active ingredient applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and further pesticides (e.g. herbicides, insecticides, fungicides, growth regulators, safeners) may be added to the pesticidal composition as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the pesticidal composition is made up with water, buffer, and/or further auxiliaries to the desired application concentration and the ready-to-use spray liquor or the pesticidal composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank and further auxiliaries may be added, if appropriate.

The invention also relates to the use of triethylammonium chloride for inhibiting the crystal growth of particles of dimpropyridaz that are suspended in an aqueous pesticidal composition. The inhibition of the crystal growth can be measured by comparing an pesticidal composition to which triethylammonium chloride has been added as compared to an pesticidal composition not containing the triethylammonium chloride. Typically the two compositions are incubated at 40° C. for 4 weeks, and the particle size is measured, e.g. by laser diffraction.

The invention further relates to a method of treating plant propagation material comprising the step of contacting the plant propagation material with the pesticidal composition.

A further object is a method for treating or protecting an animal from infestation or infection by invertebrate pests which comprises bringing the animal in contact with a pesticidally effective amount of the pesticidal composition.

A further object is a method for combating or controlling invertebrate pests, which method comprises contacting said pest or its food supply, habitat or breeding grounds with a pesticidally effective amount of the pesticidal composition as defined in any of claims.

A further object is a method for protecting growing plants from attack or infestation by invertebrate pests, which method comprises contacting a plant, or soil or water in which the plant is growing, with a pesticidally effective amount of the pesticidal composition.

The pesticidal composition is suitable for use in protecting crops, plants, plant propagation materials, such as seeds, or soil or water, in which the plants are growing, from attack or infestation by animal pests.

The pesticidal composition is effective through both contact and ingestion. Furthermore, the pesticidal composition can be applied to any and all developmental stages, such as egg, larva, pupa, and adult.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidal composition to the furrow, and closing the furrow. Foliar application refers to the application of the pesticidal composition to plant foliage, e.g. through spray equipment. For foliar applications, it can be advantageous to modify the behavior of the pests by use of pheromones in combination with pesticidal composition. Suitable pheromones for specific crops and pests are known to a skilled person and publicly available from databases of pheromones and semiochemicals, such as http://www.pherobase.com.

As used herein, the term "contacting" includes both direct contact (applying the pesticidal composition directly on the animal pest or plant—typically to the foliage, stem or roots of the plant) and indirect contact (applying the pesticidal composition to the locus, i.e. habitat, breeding ground, plant, seed, soil, area, material or environment in which a pest is growing or may grow, of the animal pest or plant).

The term "effective amount" denotes an amount of the active ingredient, which is sufficient for controlling harmful fungi on cultivated plants or in the protection of materials and which does not result in a substantial damage to the treated plants. Such an amount can vary in a broad range and is dependent on various factors, such as the pest species to be controlled, the treated cultivated plant or material, the climatic conditions and the specific active ingredient used.

The term "invertebrate pest" includes arthropods, gastropods, and nematodes. Preferred animal pests according to the invention are arthropods, preferably insects and arachnids, in particular insects. Insects, which are of particular relevance for crops, are typically referred to as crop insect pests.

The term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rapeseed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; citrus fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called Stevia); natural rubber plants or ornamental and forestry plants, such as flowers (e.g. carnation, petunias, geranium/pelargoniums, pansies and impatiens), shrubs, broad-leaved trees (e.g. poplar) or evergreens, e.g. conifers; eucalyptus; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes. The term "plant" also includes cultivated plants.

The term "cultivated plants" is to be understood as including plants which have been modified by mutagenesis or genetic engineering in order to provide a new trait to a plant or to modify an already present trait.

Advantages: the pesticidal composition is characterized by a very high storage stability, reduced particle growth (e.g. crystal growth), reduced sedimentation, reduced gelling, an advantageous rheological profile, and high biological efficacy.

The following examples illustrate the invention.

EXAMPLES

The following ingredients were used for preparing the pesticidal compositions of the examples. Insecticide A: 1-[(1RS)-1,2-dimethylpropyl]-N-ethyl-5-methyl-N-pyridazin-4-yl-1H-pyrazole-4-carboxamide.

Weting Agent: ethoxylated castor oil, 40 polymerized ethylene oxide units per molecule on average, saponification value 58-66 (according to ISO 3657)

Polymeric Additive: sulfomethylated lignosulfonate, organic sulfur content approximately 9 wt %, mass average molecular weight 20 to 50 kDa Antifoam: emulsion of dimethylsiloxan on silica particles, defoamer content 20 wt %

Biocide A: glycol based solution of benzisothiazolinone

Biocide B: aqueous composition of benzisothiazolinones and 5-chloro-2-methylisothiazolin-3-one Additive A: hydrophobic fumed silica, surface modified with dimethyldichlorosilane, surface area 130 m$^2$/g Stabilizer A: polyarylphenylether sulfate, ammonium salt, viscous liquid at 20° C.

Example-1: Preparation of Suspension Concentrates

Suspension concentrate were prepared containing the ingredients according to Table A. The suspension concentrates differed by the type and concentration of Stabilizer used. For each type of Stabilizer, suspension concentrates with 0.0 wt %, 0.1 wt %, 0.2 wt %, 0.4 wt %, 0.6 wt %, 0.8 wt % and 1 wt % of the respective Stabilizer were produced. Tested Stabilizers were triethylammonium chloride, sodium chloride, ammonium chloride, ammonium sulfate, tri-ethyl-ammonium bromide, Stabilizer A, and tetraethylammonium iodide.

In a first step, a premix containing 3 wt % of Xanthan Gum was made by adding Xanthan Gum, part of Biocide A and Biocide B to water. The premix was mixed with a cowles blade until the Xanthan Gum was fully hydrated and the premix was homogenous.

In a second step, Stabilizer solutions containing 10 wt % of a given Stabilizer as listed in Table B were prepared by diluting the respective Stabilizer in water with agitation.

In a third step, a millbase was prepared by adding Insecticide A, 50% of the allotted Wetting Agent, Polymeric Additive, Antifoam, the remaining Biocide A, the remaining Biocide B, acetic acid, and Additive A to the remaining water. The mixture was homogenized until uniform and then milled in a bead mill until a mean particle size of 2-3 microns was achieved.

After the millbase reached particle size, it was mixed with the remaining Wetting Agent, and the premix to yield the final suspension concentrates.

After the final suspension concentrate had been prepared, the volume of the suspension concentrate was split into several subsamples and the respective Stabilizer solution and water were added and mixed until homogeneous.

TABLE A

| Ingredients of suspension concentrates SC-1, and SC-C1, SC-C2, SC-C3, SC-C4, SC-C5, and SC-C6. | |
|---|---|
| Component | Concentration [wt %] |
| Insecticide A | 20.91 |
| Wetting Agent | 8.00 |
| Polymeric Additive | 2.00 |
| Antifoam | 0.40 |
| Biocide A | 0.20 |
| Biocide B | 0.10 |
| Xanthan Gum | 0.13 |
| Acetic acid | 0.10 |
| Additive A | 1.00 |
| Stabilizer | As listed in Table B |
| Water | to 100 |

Example-2: Stability Assessment

All suspension concentrates as prepared in Example-1 were placed in a −10° C. / 30° C. cycling chamber (temperature cycled at every 24 hours). After 8 or 16 weeks storage, samples were evaluated under microscope for crystal growth. The results are summarized in Table B:

TABLE B

Summary of stability assessment for suspension concentrates that contain different stabilizers at various concentrations.

| Stabilizer | Time in cycling chamber | Microscope Observations Stabilizer concentration in suspension concentrates [wt %] | | | | | | |
|---|---|---|---|---|---|---|---|---|
| | | 0.00% | 0.10% | 0.20% | 0.40% | 0.60% | 0.80% | 1.00% |
| Triethyl-ammonium chloride | 16 weeks | Crystal growth | Crystal Growth | Crystal Growth | No Crystal Growth | No Crystal Growth | No Crystal Growth | No Crystal Growth |
| Sodium chloride | 8 weeks | Crystal Growth | Crystal Growth | Crystal Growth | Crystal Growth | Crystal Growth | Crystal Growth | Crystal Growth |
| Ammonium chloride | 8 weeks | Crystal Growth | Crystal Growth | Crystal Growth | Crystal Growth | Crystal Growth | Crystal Growth | Crystal Growth |
| Ammonium sulfate | 8 weeks | Crystal Growth | Crystal Growth | Crystal Growth | Crystal Growth | Crystal Growth | Crystal Growth | Crystal Growth |
| Triethyl-ammonium bromide | 8 weeks | Crystal Growth | Crystal Growth | Crystal Growth | Crystal Growth | Crystal Growth | Crystal Growth | Crystal Growth |

TABLE B-continued

Summary of stability assessment for suspension concentrates that contain different stabilizers at various concentrations.

| Stabilizer | Time in cycling chamber | Microscope Observations Stabilizer concentration in suspension concentrates [wt %] | | | | | | |
|---|---|---|---|---|---|---|---|---|
| | | 0.00% | 0.10% | 0.20% | 0.40% | 0.60% | 0.80% | 1.00% |
| Stabilizer A | 8 weeks | Crystal Growth | Crystal Growth | Crystal Growth | Crystal Growth | Crystal Growth | Crystal Growth | Crystal Growth |
| Tetraethyl-ammonium iodide | 8 weeks | Crystal Growth | Crystal Growth | Crystal Growth | Crystal Growth | Crystal Growth | Crystal Growth | Crystal Growth |

The invention claimed is:

1. An aqueous pesticidal composition comprising
a) suspended particles comprising dimpropyridaz; and
b) triethylammonium chloride;
wherein a concentration of the triethylammonium chloride is at least 0.3 wt % based on the total weight of the pesticidal composition.

2. The pesticidal composition according to claim 1, wherein the suspended particles a) have a D50-value of from 1 to 5 µm.

3. The pesticidal composition according to claim 1, wherein the concentration of the triethylammonium chloride is up to 2 wt %.

4. The pesticidal composition according to claim 1, wherein the suspended particles are suspended crystalline particles.

5. The pesticidal composition according to claim 1, wherein a weight ratio of the suspended particles a) to the triethylammonium chloride is at up to 70:1.

6. The pesticidal composition according to claim 1, comprising
a) 40 to 95 wt % of water
b) 5 to 40 wt % of the suspended particles;
c) 0.3 to 2 wt % of triethylammonium chloride;
each based on the total weight of the pesticidal composition.

7. The pesticidal composition according to claim 1, wherein the triethylammonium chloride is present in dissolved form.

8. The pesticidal composition according to claim 1 comprising a further pesticidally active ingredient.

9. A process for producing a pesticidal composition as defined in claim 1, comprising contacting triethylammonium chloride, particles comprising dimpropyridaz, and water.

10. A method for inhibiting the crystal growth of particles of dimpropyridaz that are suspended in an aqueous pesticidal composition comprising the incorporation of triethylammonium chloride.

11. A method of treating a plant propagation material comprising contacting the plant propagation material with the pesticidal composition as defined in claim 1.

12. A method for treating or protecting an animal from infestation or infection by invertebrate pests comprising bringing the animal in contact with a pesticidally effective amount of the pesticidal composition as defined in claim 1.

13. A method for combating or controlling invertebrate pests, comprising contacting said pest or its food supply, habitat or breeding grounds with a pesticidally effective amount of the pesticidal composition as defined in claim 1.

14. A method for protecting growing plants from attack or infestation by invertebrate pests, comprising contacting a plant, or soil or water in which the plant is growing, with a pesticidally effective amount of the pesticidal composition as defined in claim 1.

* * * * *